Sept. 14, 1965  E. BOSSHARD  3,206,366
METHOD OF REPLACING FUEL ELEMENTS IN A NUCLEAR REACTOR
Filed Feb. 21, 1961  4 Sheets-Sheet 1

Inventor:
ERNST BOSSHARD.
By K. R. Mayr
Attorney.

Sept. 14, 1965        E. BOSSHARD        3,206,366
METHOD OF REPLACING FUEL ELEMENTS IN A NUCLEAR REACTOR
Filed Feb. 21, 1961        4 Sheets-Sheet 2
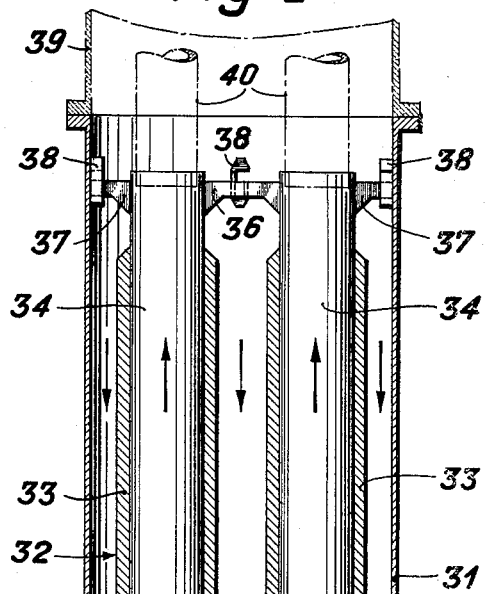
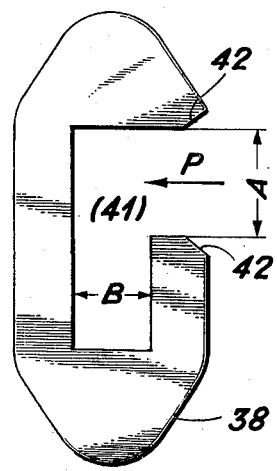
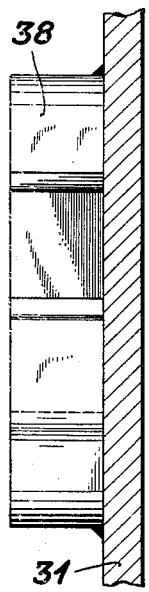
Inventor:
ERNST BOSSHARD.
By K. A. Mayr
Attorney.

Sept. 14, 1965   E. BOSSHARD   3,206,366
METHOD OF REPLACING FUEL ELEMENTS IN A NUCLEAR REACTOR
Filed Feb. 21, 1961   4 Sheets-Sheet 3
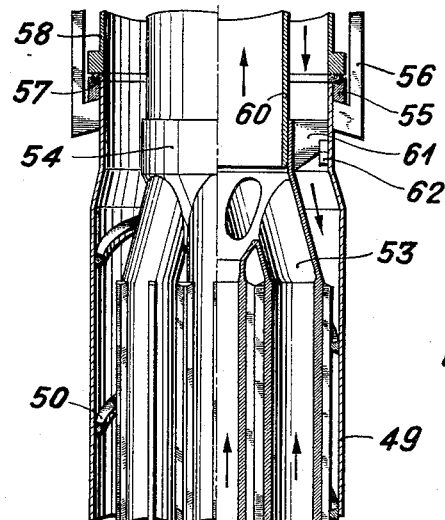
Fig.5
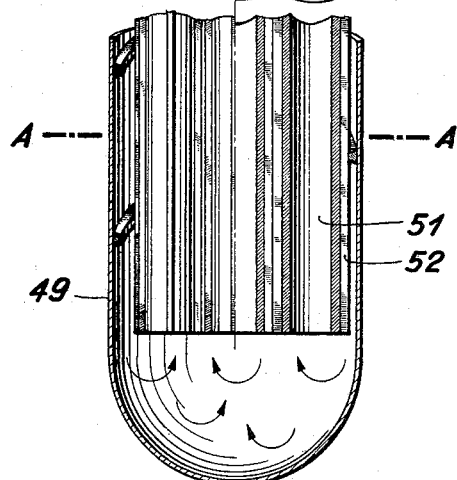
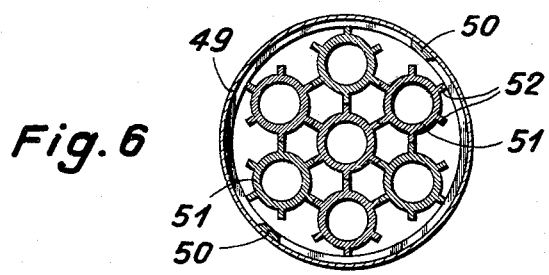
Fig.6
Inventor:
ERNST BOSSHARD.
By K. R. May
Attorney:

Inventor:
ERNST BOSSHARD.
By K. A. Mayr
Attorney.

United States Patent Office 3,206,366
Patented Sept. 14, 1965

3,206,366
METHOD OF REPLACING FUEL ELEMENTS
IN A NUCLEAR REACTOR
Ernst Bosshard, Winterthur, Switzerland, assignor to
Sulzer Freres, S.A., Winterthur, Switzerland, a corporation of Switzerland
Filed Feb. 21, 1961, Ser. No. 90,883
Claims priority, application Switzerland, Mar. 4, 1960,
2,477/60
4 Claims. (Cl. 176—30)

The invention relates to a method of replacing an oblong fuel element containing fissionable material and inserted in a can or container having an opening through which a coolant is supplied to and relieved from the can, the latter being removably placed in a corresponding passage in the moderator unit of a nuclear reactor.

It is an object of the invention to provide a method of changing an oblong fuel element in a nuclear reactor which element is inserted in a can having an opening through which a coolant is supplied to and removed from the can whereby the fuel element is extracted from the can through said opening and a new fuel element is inserted in the can while the latter remains within the radiation shield of the reactor. In this way the number of cans is reduced and only the relatively light spent fuel elements must be moved outside of the radiation shield and relatively light new fuel elements need be moved through the radiation shield.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 2 is a diagrammatic longitudinal sectional view of a fuel element and container assembly according to the invention.

FIG. 3 is a large scale front elevation of a detail of the assembly shown in FIG. 2.

FIG. 4 is a side elevation of a part of the assembly shown in FIG. 3.

FIG. 5 is a diagrammatic longitudinal part-sectional view of a modified fuel element and container assembly according to the invention.

FIG. 6 is a cross sectional view of the assembly view of a modified fuel element and container assembly according to the invention.

Figure 1:
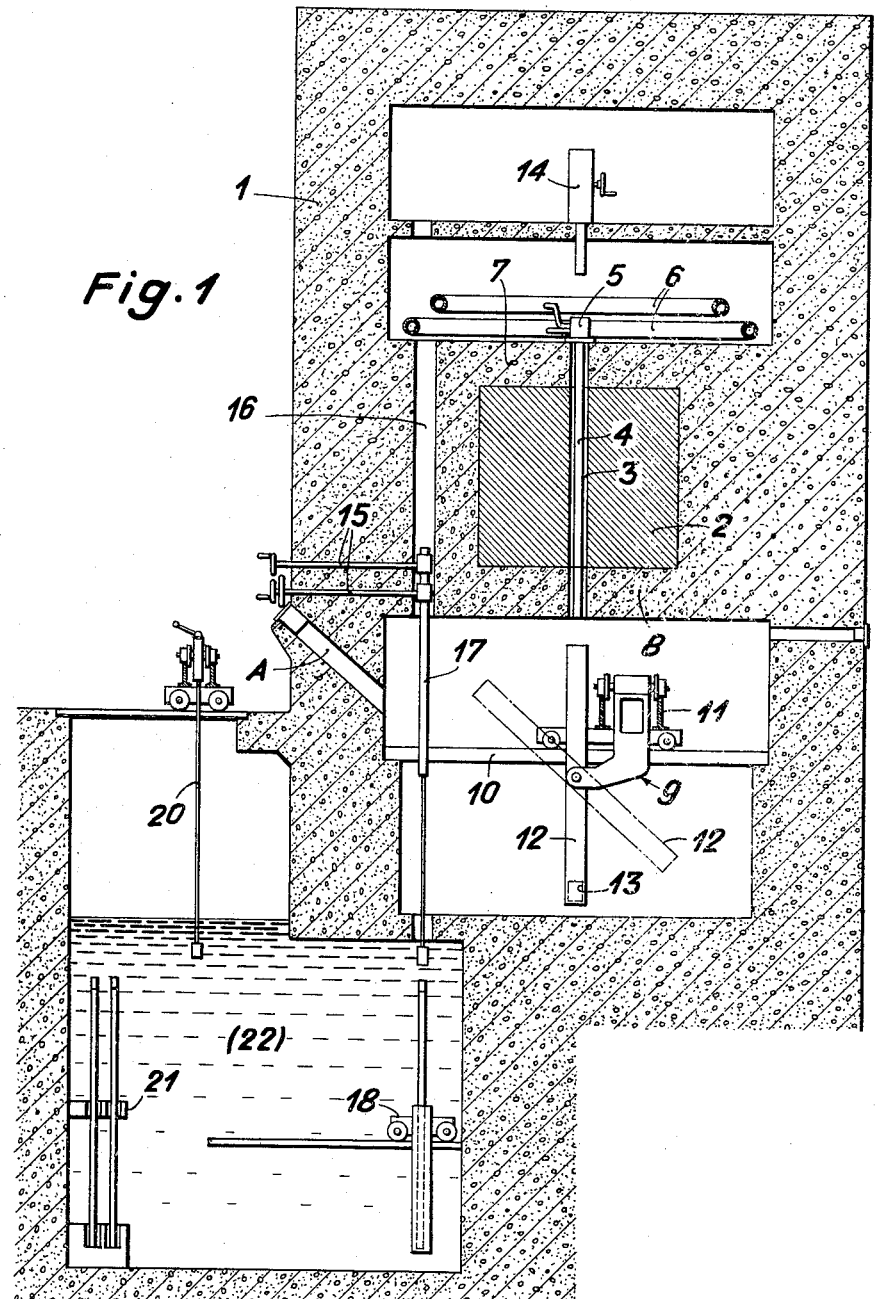
FIG. 1 is a diagrammatic vertical sectional view of a nuclear reactor provided with fuel element changing means suitable for performing the method according to the invention.

Referring to FIG. 1 of the drawing, a moderator unit 2 having channels or passages 3 is placed inside a radiation shield 1. Fuel element and can assemblies 4 are placed in the passages 3, only one assembly 4 being shown in FIG. 1. Each assembly comprises a container or can and a fuel body or element received therein. Each can is provided with a head 5 which retains the assembly 4 in the respective channel or passage in the moderator structure. The heads 5 enable coolant to be supplied to and removed from the assemblies 4 by way of pipes 6. A radiation shield 7 is placed on top of the moderator body 2 and below the heads 5. A radiation shield 8 is placed at the bottom of the body 2 and above a fuel element and container assembly changing apparatus 9 comprising a tube 12 movable along two tracks 10, 11 which are normal to one another, and a lifting device 13 disposed in the tube 12. Manipulating means 14 are placed above the heads 5. Laterally of the reactor core is a handling device 15 including a lifting mechanism 17 movable in a vertical passage 16. The mechanism 17 is adapted to engage and to raise or lower a fuel element in the tube 12. The elements are lowered by the mechanism 17 and are transferred to a conveying device 18 for movement below a crane 20 which deposits the fuel elements in a storage device 21 placed below water level in a storage chamber 22.

To replace a fuel element, the changing apparatus 9 is moved to place its tube 12 below the can containing the fuel element to be replaced. The lifting device in the tube 12 is moved into its top position where it supports the assembly 4. The head 5 is then released by the manipulating device 14. Thereupon the lifting device 13 is operated to lower the assembly 4 into the tube 12, whereupon the latter is moved below the lifting mechanism 17 which removes the fuel element from the can and places the fuel element in the passage 16. After the apparatus 9 has moved away, the fuel element can be transferred from the mechanism 17 to the conveying device 18 and moved to the crane 20 which deposits the spent fuel element in the storage chamber 22. The sequence of operations is reversed to insert a new fuel element into a can to form a new assembly 4 and place it into the vacant passage 3.

FIG. 2 illustrates a fuel element and can assembly according to the invention. An insert 32 containing fissionable substance is received in a can or container 31, also known as a pressure tube, whose bottom is closed. The fuel element consists of tubes 33 made of fissionable material and surrounding tubes 34 made of a suitable structural material. The tubes 34 are interconnected by webs 35 and 36. Arms 37 extend from the upper portions of the tubes 34 which portions are opposite the inside of the can 31. The arms 37 extend into suitable recesses of supports 38 mounted on the inside of the can 31. A coolant flows through the assembly shown in FIG. 2 in the directions indicated by arrows. A coolant supply conduit 39 is connected to the top of each can 31 for passing a coolant into the space between the tubes 33, 34 and the can 31, coolant being removed from the tubes 34 through outlet pipes 40.

When a fuel element has to be replaced, for instance, when the fissionable substance thereof has been spent and new fissionable material has to be introduced into the reactor, the entire fuel element and can assembly is removed from the respective channel in the moderator unit in the manner hereinbefore described. The insert 32–37 is removed from its can 31 as long as it is inside the reactor radiation shield 1. To do this the can 31 is retained in the tube 12 whereupon the insert is raised and slightly turned to move it out of the slot in the supports 38. The sequence of operations is reversed to introduce a new insert into the can. The can containing the new insert is introduced by the apparatus 9 into a vacant channel in the reactor which is either the channel vacated by the old assembly or, if there is a special changing plan, another vacant channel.

The supports 38 are so shaped that, when an assembly is removed from the respective channel in the moderator unit, the insert cannot be retained by the coolant supply and/or outlet pipes. Slight corrosion or deformations caused by radiation might hold the tubes 34 to the corresponding coolant pipes, requiring separation by force. In such a case, when the can 31 descends in FIG. 2, the arms 37 abut against the top of a recess in the supports 38 and are moved along thereby.

A support member 38 is shown in large scale in FIGS. 3 and 4. FIG. 4 is an elevation looking in the direction of an arrow P in FIG. 3. Each member 38 is formed of a metal plate which is welded to the inside of the can 31 and provided with a recess or slot 41 forming a guide for the free end of an arm 37. The latter can enter the guide slot through an entrance whose height A is slightly greater than the corresponding height of the arm 37. The width B of the inner portion of the guide slot 41 is slightly greater than the width of the arm 37. Entry of the arm 37 into the guide slot is facilitated by beveling the edges at 42 at the entrance of the slot.

FIGS. 5 and 6 illustrate a modified can and fuel element. The inside wall of a can or container 49, also known as a pressure tube, is provided with spacers 50. The insert is formed by tubes 51 made of material containing a fissionable substance and provided with axial ribs 52. The upper ends of the tubes 51 are connected by tubes 53 to a coolant collector 54. The outside of the upper end of the can 49 is provided with a collar 55 engaged by hooks 56 of a retaining device which presses the can against a coolant supply tube 58, an annular packing 57 being interposed between the top of the can and the tube 58. The end of a coolant relief tube 60 is inserted in the collector 54. The outside of the latter is provided with radial arms 61 which bear against supports 62.

Coolant is introduced through the annular space between the tubes 58 and 60 and flows through the space between the tubes 51 and between the tubes 51 and the can 49. The coolant returns through the inferior of the tubes 51 to the collector 54 and leaves the fuel element through the tube 60.

To change the fuel element, the hooks 56 are released whereafter the entire fuel element and can assembly is lowered and thus separated from the tubes 58 and 60. The insert formed by the parts 51, 53 and 54 can now be lifted out of the can 49. In the system shown in FIG. 5 the arms 61 rest on the securing members 62 and there is no provision for retaining the arms 61 in the supports 62. This is satisfactory when other provisions, such as the design of the parts 54 and 60 and/or the choice of the materials used, make it unlikely that the part 54 will stick to the tube 60. However, the arms 61 and the supports 62 may be shaped similarly to the arms 37 and the supports 38 shown in FIGS. 2 to 4.

Figure 7:
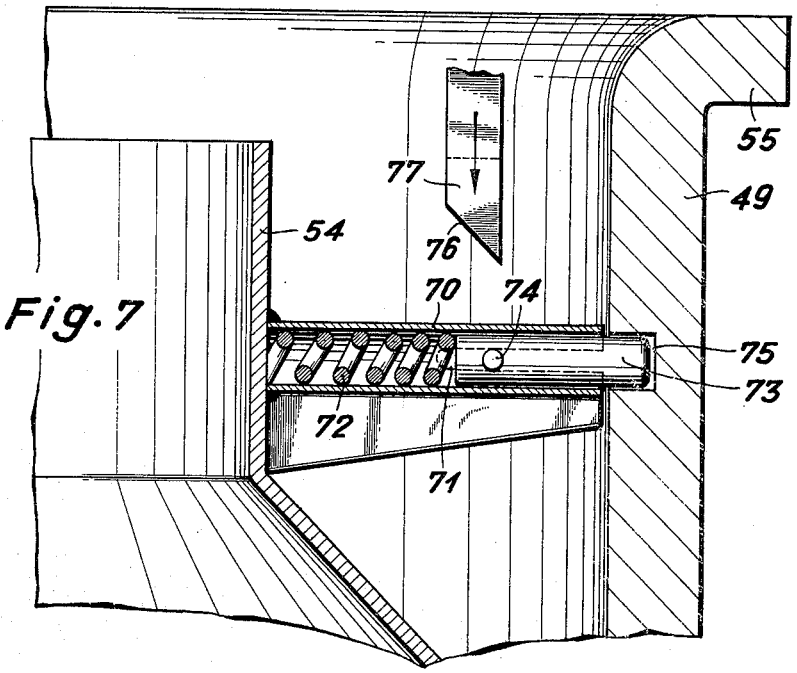
FIG. 7 is a diagrammatic longitudinal sectional view of a part of the open end portion of an assembly according to the invention, showing a mechanism for releasably securing a fuel body or element to its can.
Figure 8:
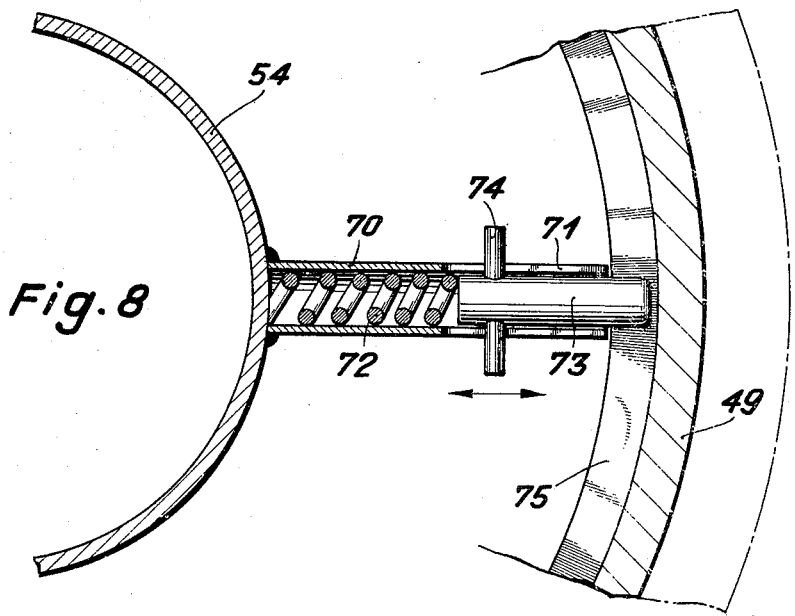
FIG. 8 is a cross sectional view of a portion of the assembly shown in FIG. 7.

FIGS. 7 and 8 illustrate a modified arrangement for releasably securing a fuel element insert to a can whereby the insert is so held in the can that relative axial movement is positively prevented. Tubes 70 provided with diametrically opposed slots 71 extend laterally from the insert, for instance, from the collector 54 shown in FIG. 5. Each tube 70 contains a spring 72 bearing against the part 54 and against a pin or latch 73 axially movable in the tube 70. The pin 73 is provided with a transverse pin 74 extending through the slots 71. All pins 73 extend into an annular groove 75 in the inside of the can 49. The changing apparatus 9 (FIG. 1) comprises parts 77 having inclined surfaces 76 adapted to cooperate with the pins 74.

During normal operation of the reactor and when removing the entire fuel element and can assembly from its channel the insert is locked to the can by the pins 73. To remove the insert from the can the parts 77 are introduced in the direction indicated by an arrow in FIG. 7 so that the pins 73 are pulled out of the groove 75 by the action of the inclined surfaces 76 on the pins 74 and the insert can be removed from the can. A new insert can then be placed in the can 49. When the pins 73 of the insert reach the groove 75 the pins snap thereinto and firmly interconnect the can and the insert.

Of course, the system according to the invention cannot only be used in connection with cans having a single opening for introducing and removing a coolant but can also be used in connection with cans having two or more such openings.

The method according to the invention make it possible to check and clean the cans before the inserts are introduced, for instance, by introducing a pressure testing device or a washing device through a passage A shown in FIG. 1 into a can resting in the tube 12 of the apparatus 9. To accomplish this the tube 12 is tiltable as shown by broken lines in FIG. 1. It is also possible to introduce through the passage A, for instance, an optical inspection device of the periscope type.

I claim:

1. A method of changing, in a nuclear reactor having a radiation shield, an oblong fuel element containing fissionable material and inserted in a container having an opening through which a coolant is supplied to and removed from the container, the latter being removably placed in a corresponding passage in a moderator unit, the method comprising removing the container containing a fuel element which must be changed from the respective passage, removing the fuel element from the container while retaining the container within the radiation shield, inserting a new fuel element into the container retained within the radiation shield, and placing the container containing the new fuel element into a vacant passage in the moderator unit.

2. A method as defined in claim 1 wherein the fuel element is removed from and a new fuel element is inserted into the container through the opening through which coolant is supplied to and removed from the container.

3. A method as defined in claim 1 including the step of cleaning the container after removal of the fuel element and before insertion of the new fuel element and while the container is within the radiation shield and outside of the moderator unit.

4. A method as defined in claim 1 including the step of testing the container after removal of the fuel element and before insertion of the new fuel element and while the container is within the radiation shield and outside of the moderator unit.

References Cited by the Examiner

UNITED STATES PATENTS

| | | | |
|---|---|---|---|
| 2,778,792 | 1/57 | Szilard | 176—39 X |
| 2,987,458 | 6/61 | Breden | 176—73 |
| 2,996,444 | 8/61 | Simnad | 176—68 |
| 3,071,529 | 1/63 | Davies | 221—81 |

OTHER REFERENCES

Nucleonics, vol. 14, No. 1, pp. 30 to 33.

CARL D. QUARFORTH, *Primary Examiner.*

REUBEN EPSTEIN, *Examiner.*

UNITED STATES PATENT OFFICE
CERTIFICATE OF CORRECTION

Patent No. 3,206,366                        September 14, 1965

Ernst Bosshard

It is hereby certified that error appears in the above numbered patent requiring correction and that the said Letters Patent should read as corrected below.

Column 1, lines 51 to 53, strike out "view of a modified fuel element and container assembly according to the inventio and insert instead -- shown in FIG. 5 --; column 3, line 33, for "inferior" read -- interior --.

Signed and sealed this 5th day of April 1966.

(SEAL)
Attest:

ERNEST W. SWIDER
Attesting Officer

EDWARD J. BRENNER
Commissioner of Patents